(12) United States Patent
Bayona P. et al.

(10) Patent No.: US 11,247,441 B2
(45) Date of Patent: Feb. 15, 2022

(54) BOPP FILM AND METHODS OF MAKING THE SAME

(71) Applicant: Inteplast Group Corporation, Livingston, NJ (US)

(72) Inventors: Rafael E. Bayona P., Morristown, TN (US); Kiran Jayantilal Soneji, Morristown, TN (US); Ronald R. Silen, Livingston, NJ (US); Todd A. O'Reilly, Morristown, TN (US)

(73) Assignee: Inteplast Group Corporation, Livingston, NJ (US)

( * ) Notice: Subject to any disclaimer, the term of this patent is extended or adjusted under 35 U.S.C. 154(b) by 55 days.

(21) Appl. No.: 16/427,995

(22) Filed: May 31, 2019

(65) Prior Publication Data

US 2020/0376819 A1 Dec. 3, 2020

(51) Int. Cl.

| | |
|---|---|
| *B32B 27/08* | (2006.01) |
| *B32B 27/30* | (2006.01) |
| *B32B 7/05* | (2019.01) |
| *C08L 23/12* | (2006.01) |
| *C08K 3/26* | (2006.01) |
| *B32B 27/32* | (2006.01) |
| *B32B 27/18* | (2006.01) |

(52) U.S. Cl.
CPC ............... *B32B 27/08* (2013.01); *B32B 7/05* (2019.01); *B32B 27/18* (2013.01); *B32B 27/30* (2013.01); *B32B 27/32* (2013.01); *C08K 3/26* (2013.01); *C08L 23/12* (2013.01); *B32B 2250/05* (2013.01); *B32B 2264/104* (2013.01); *B32B 2307/41* (2013.01); *B32B 2310/14* (2013.01); *B32B 2519/00* (2013.01)

(58) Field of Classification Search
None
See application file for complete search history.

(56) References Cited

U.S. PATENT DOCUMENTS

| | | | |
|---|---|---|---|
| 4,377,616 A | | 3/1983 | Ashcraft et al. |
| 4,758,462 A | | 7/1988 | Park et al. |
| 4,767,675 A | | 8/1988 | Cyr et al. |
| 5,492,757 A | * | 2/1996 | Schuhmann ............ B32B 27/32 428/329 |
| 5,945,205 A | | 8/1999 | Keller et al. |
| 8,124,243 B2 | | 2/2012 | Wright et al. |
| 2003/0211298 A1 | | 11/2003 | Migliorini et al. |

(Continued)

*Primary Examiner* — Chinessa T. Golden
(74) *Attorney, Agent, or Firm* — Lerner, David, Littenberg, Krumholz & Mentlik, LLP (57) ABSTRACT

Multi-layer films and labels are disclosed herein. In an embodiment, a multi-layer film includes a core layer, a first intermediate layer disposed on a first side of the core layer, a second intermediate layer disposed on a second side of the core layer, a first skin layer disposed on the first intermediate layer and arranged such that the first intermediate layer is disposed between the core layer and the first skin layer, and a second skin layer disposed on the second intermediate layer and arranged such that the second intermediate layer is disposed between the core layer and the second skin layer, wherein the core layer includes first particles in an amount ranging from about 8 to about 20 wt %, based on the total weight of the core layer, the opacity is about 90 or greater, and the gloss ranges from about 60 to less than about 80.

20 Claims, 4 Drawing Sheets

(56) References Cited

U.S. PATENT DOCUMENTS

| | | | | |
|---|---|---|---|---|
| 2004/0219321 A1* | 11/2004 | Squier | ............ | B32B 27/20 |
| | | | | 428/40.1 |
| 2006/0024520 A1* | 2/2006 | Kong | ............ | C08K 3/01 |
| | | | | 428/517 |
| 2009/0297820 A1* | 12/2009 | Kovalchuk | ............ | B32B 27/18 |
| | | | | 428/304.4 |

* cited by examiner

BOPP FILM AND METHODS OF MAKING THE SAME

FIELD OF THE INVENTION

The present disclosure relates generally to the field of three, five or seven multilayer biaxially oriented polypropylene (BOPP) films and label applications.

BACKGROUND

Cavitation in BOPP films is a technique known in the art. The cavitation or voiding is achieved by using non compatible agents i.e. inorganics earths like $CaCO_3$, $SiO_2$, $TiO_2$, Talcum or organic materials like PBT, PMMA, PA6, blended in polypropylene matrix and using a biaxially stretching process. Usually the cavitation agent is added to the core or any subsequent layer of a BOPP film to reduce overall unit weight, which translates in a higher yield of area per unit weight for the users of the film giving a higher number of packages or labels per unit weight. The core layer of a BOPP film is usually the thickest layer of the film and would result in the most improvement in yield during manufacturing, but also it will be discussed the use of cavitating agents in the subjacent layers to the core. On the other side, the use of cavitating agent reduce other physical properties of the BOPP film, such as the modulus and craze resistance. In some cases, such as in BOPP films used in packaging, this effect is desirable because the packaging is designed to be torn and easily removed from the article, such as a candy bar or other article wrapped in disposable packaging. However, in label applications, the reduction of such properties like modulus created by cavitation is undesirable.

Moreover, it is desired for the label to have a high glossy solid color finish. Cavitation introduces a pearlescent finish to the film due to the diffraction of the light on the surface of the particles used as cavitating agents. As used herein, 'pearlescent' is understood to mean 'having a luster resembling that of mother-of-pearl'. For example, cavitation may cause an otherwise solid glossy white film to appear as having multi-colored luster that is consistent with mother-of-pearl. Typically, pearlescent is based on customer preference on the appearance of the film.

The use of cavitating agents introduces a rough surface of the layer where it is included. This roughness is usually followed by the adjacent layers. This effect reduces the reflection of the light on the film reducing the gloss of the film. For example, the cavitation agent can create 'bumps' on the surface of the core which can be translated through successive layers disposed on the core to the surface of the label, making the surface of the label rough. As a general request in the market the surface of the label, should have a smooth glossy surface to be printed and/or coated. In view of the foregoing, there is a need in the art for BOPP films for label application that use cavitation agents and which have improved appearance and mechanical properties.

BRIEF SUMMARY

Multi-layer films and labels are disclosed herein.

One aspect of the present disclosure relates to a multi-layer film comprises a core layer having a first side and a second side opposite the first side, wherein the core layer comprises a polymer; a first intermediate layer disposed on the first side of the core layer; a second intermediate layer disposed on the second side of the core layer; a first skin layer disposed on the first intermediate layer and arranged such that the first intermediate layer is disposed between the core layer and the first skin layer, and a second skin layer disposed on the second intermediate layer and arranged such that the second intermediate layer is disposed between the core layer and the second skin layer, wherein the core layer has a thickness that is greater than thickness of the first or the second intermediate layers or the skin layer, wherein the core layer includes first particles disposed therein, wherein the amount of first particles ranges from about 8 to about 20 percent by weight (wt %), based on the total weight of the core layer, wherein the average particles size of the first particles ranges from about 0.8 µm to about 3.0 µm, wherein the opacity of the multi-layer film, measured by TAPPI T425, is about 90 or greater, wherein the gloss of the multi-layer film, measured by ASTM D2457 at an angle of 45°, ranges from about 60 to less than 80. In some embodiments, the opacity ranges from about 90 to about 92.

Another aspect of the present disclosure relates to a label, comprising the multi-layer film, and an adhesive layer.

DETAILED DESCRIPTION

The following detailed description of BOPP films refers to the accompanying drawings that illustrate exemplary embodiments consistent with these films. Other embodiments are possible, and modifications may be made to the embodiments within the spirit and scope of the methods and systems presented herein. Therefore, the following detailed description is not meant to limit the films described herein. Rather, the scope of these devices is defined by the appended claims. The BOPP films discussed herein advantageously have low unit weight (weight/unit area), high yield (area/unitweight), high smooth surface, e.g., results in a glossy appearance, and high modulus, e.g., stiffness.

Figure 1A:
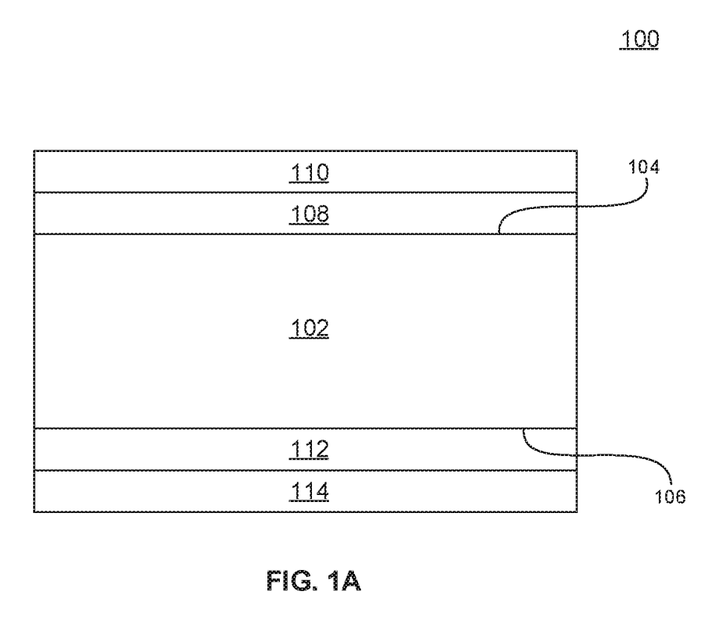
FIG. 1A illustrates a cross-section of a multi-layer film in accordance with an embodiment of the present disclosure.

FIG. 1A illustrates a cross-section of a multi-layer film 100 in accordance with an embodiment of the present disclosure. The multi-layer film 100 includes a polymer-based core layer 102. The polymer-based core layer 102 has a first surface 104 and an opposing second surface 106. The polymer-based core layer 102 functions to provide the multi-layer film 100 with mechanical properties, such as stiffness, tensile strength, modulus and opacity.

The polymer-based core layer 102 may range in thickness from about 37 micrometers (µm) to about 57 µm, or about 43 µm to about 52 µm.

The polymer-based core layer 102 comprises a polymer such as polypropylene. The polypropylene can be a homopolymer with either high or standard crystallinity. The polymer may be present in the core layer 102 in an amount of greater than about 50 weight %, based on the total weight of the core layer. In some embodiments, the polymer may be present in an amount ranging from about 50 wt % to about 95 wt %, or about 70 wt % to about 95 wt %, or about 75 wt % to about 95 wt %, or about 80 wt % to about 95 wt %, or about 85 wt % to about 95 wt %, or about 90 wt % to about 95 wt %, based on the total weight of the core layer. The core layer 102 includes first particles. The first particles can include inorganics earths such as $CaCO_3$, $SiO_2$, Talcum and/or organic materials such as PBT, PMMA, PA6. The first particles may be present in an amount ranging from about 0.5 wt % to about 20 wt %, or about 1 wt % to about 17 wt %, or about 2 wt % to about 15 wt %, or about 8 wt % to about 10 wt %, based on the total weight of the core layer 102.

Figure 1B:
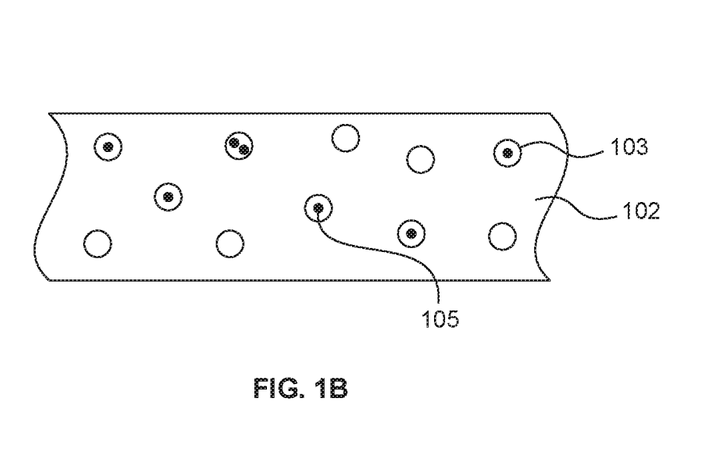
FIG. 1B illustrates a cross-section of a polymer-based core layer in accordance with an embodiment of the present disclosure.

Referring to FIG. 1B, the structure of the polymer-based core layer 102 may be a polymer matrix having voids 103 disposed therein. At least some of the voids 103 are occupied by one or more first particles 105. The polymer and the first particles are present in the polymer-based core layer 102 in a weight ratio ranging from about 80:20 to about 90:10, or about 85:15 to about 87:13. The weight ratio may be adjusted to control mechanical properties of the polymer-based core layer 102. For example, increasing the weight ratio may impart higher tensile strength and consequent a lower yield because more first polymer is used. The average particles size of the first particles may range from about 0.2 μm to about 5 μm, or about 0.2 μm to about 4 μm, about 0.2 μm to about 3 μm, or about 0.2 μm to about 2 μm, or about 0.8 μm to about 3 μm. The average particle size may be adjusted to control the size of the void or cavities created in the layer. For example, a cavitating agent with large average particle size at the same weight ratio can result in very low unit weight (mass per area unit) but also may deteriorate the modulus of the film In one embodiment, the average particle size of the first particles is sub-micron. The sub-micron average particles size may reduce surface roughness on the first and second surfaces 104, 106 of the polymer-based core layer 102. The reduced surface roughness may advantageously translate to the surface to the surfaces of successive layers, such as intermediate layers or skin layers of the multi-layer film 100 described below.

The core layer 102 may further include other materials, such as migratory slip or other migratory additives known in the art. These materials may be present in amount ranging from 0.5 wt % to about 20 wt %, or about 1 wt % to about 17 wt %, or about 2 wt % to about 15 wt %, or about 1 wt % to about 5 wt %, based on the total weight of the core layer 102.

Returning to FIG. 1A, an intermediate layer 108 is disposed on the first surface 104 of the core layer 102. The intermediate layer 108 may range in thickness from about 0.5 μm to about 8 μm, or about 1 μm to about 6 μm, or about 2 μm to about 4 μm, or about 1 μm to about 2 μm.

The intermediate layer 108 comprises a polymer that includes homopolymers or copolymers or terpolymers of polypropylene and/or polypropylene/ethylene and/or polypropylene/ethylene/butylene. The polymer may be present in the intermediate layer 108 in an amount of greater than about 50 weight %, based on the total weight of the core layer. In some embodiments, the polymer may be present in an amount ranging from about 50 wt % to about 100 wt %, or about 70 wt % to about 97 wt %, or about 75 wt % to about 97 wt %, or about 80 wt % to about 97 wt %, or about 85 wt % to about 97 wt %, or about 90 wt % to about 97 wt %, based on the total weight of the intermediate layer. The intermediate layer 108 includes second particles. Exemplary second particles include as inorganics earths, such as $CaCO_3$, $SiO_2$, Talcum and/or organic materials, such as PBT, PMMA, PA6. The second particles may be present in an amount ranging from 2 wt % to about 20 wt %, or about 3 wt % to about 17 wt %, or about 5 wt % to about 15 wt %, or about 8 wt % to about 10 wt %, based on the total weight of the intermediate layer 108.

The intermediate layer 108 can act as an adhesive between the polymer-based core layer 102 and another layer. For example, if the polymer-based core layer 102 and another layer are made of different materials having different properties, the polymer-based core layer 102 and the other layer may de-laminate if directly contacted with each other. The intermediate layer 108 may be disposed between the polymer-based core layer 102 and the other layer to form a stronger laminate. Alternative or additional functions of the intermediate layer 104 may include acting as barrier to oils that could penetrate into the core layer 102.

Figure 1C:
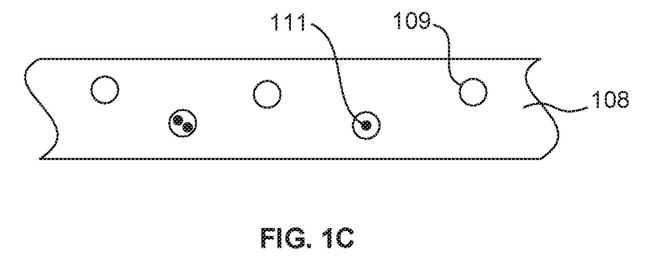
FIG. 1C illustrates a cross-section of an intermediate layer in accordance with an embodiment of the present disclosure.

Referring to FIG. 1C, the structure of the intermediate layer 108 may be a polymer matrix having voids 109 disposed therein. At least some of the voids 109 are occupied by one or more second particles 111. The polymer and the second particles are present in the intermediate layer 108 in a weight ratio ranging from about 80:20 to about 90:10, or about 85:15 to about 87:13. The weight ratio may be adjusted to control mechanical properties of the intermediate layer 108 in a similar manner as described herein for the polymer-based core layer 102. The average particles size of the second particles may range from about 0.2 μm to about 5 μm, or about 0.2 μm to about 4 μm, about 0.2 μm to about 3 μm, or about 0.2 μm to about 5 μm, or about 0.8 μm to about 3 μm The average particle size may be adjusted to control properties of the intermediate layer 108 in a similar manner as described for the polymer-based core layer 102. In one embodiment, the average particle size of the second particles is sub-micron. The sub-micron average particles size may reduce surface roughness of the intermediate layer 108. The reduced surface roughness may advantageously translate to the surfaces of successive layers, such as skin layers described below.

The intermediate layer 108 may further include other materials, such as pigments which may include $TiO_2$ or rare earth elements to add the opaque effect to the film. These materials may be present in amount ranging from about 1 wt % to about 5 wt %, based on the total weight of the intermediate layer 108.

The cavitation of the intermediate layer 108 can help to alleviate the amount of cavitation needed for the polymer-based core layer 102. Reducing the amount of cavitation needed in the core layer 102 can allowed the polymer-based core layer 102 to retain mechanical properties that can otherwise be lost by cavitation.

Returning to FIG. 1A, a skin layer 110 is disposed on the intermediate layer 108 such that the intermediate layer 108 is arranged between the core layer 102 and the skin layer 110. The skin layer 110 may impart optical properties to the multi-layer film, such as color, and a glossy or matte finish. The skin layer 110 may further be an ink receptive layer, and/or serve as an adhesive for another layer (not illustrated in FIG. 1A) that is an ink receptive layer.

The skin layer may have a thickness ranging up to about 5 microns. In some embodiments, the thickness may range from about 1 micron to about 2 microns. The skin layer may include a polymer, such as homopolymers or copolymers or terpolymers of polypropylene and/or polypropylene/ethylene and/or polypropylene/ethylene/butylene. The polymer may be present in amount ranging from about 50 wt % to about 90 wt % based on the total weight of the skin layer 110. The skin layer may include other materials, such as pigments. These other materials may be present in the skin layer 110 in an amount ranging from about 1 wt % to about 10 wt % based on the total weight of the skin layer 110.

The multi-layer film 100 includes a second intermediate layer 112 disposed on the second surface 106 of the polymer-based core layer 102. The second intermediate layer 112 may have the same composition, dimensions, and/or function of the intermediate layer 108, or may be different from the intermediate layer 108 in one or more aspects. For example, different skin layers may require different intermediate or tie layers. The second intermediate layer 112 can be an optional layer and may not be present in some applications.

A second skin layer 114 is disposed on the second intermediate layer 112 such that the second intermediate layer 112 is arranged between the polymer-based core layer 102 and the second skin layer 114. The second skin layer 114 may have the same composition, dimensions, and/or function of the skin layer 110, or may be different from the skin layer 110 in one or more aspects. In one embodiment, such when the multi-layer film is used in a label application, the skin layer 110 may be utilized as an ink receptive surface and the second skin layer 114 may be utilized as an adhesive layer to bond the multi-layer film to an object, or alternative as a layer that is receptive to an adhesive film, where the adhesive film bonds the multi-layer film 100 to the object.

Figure 1D:
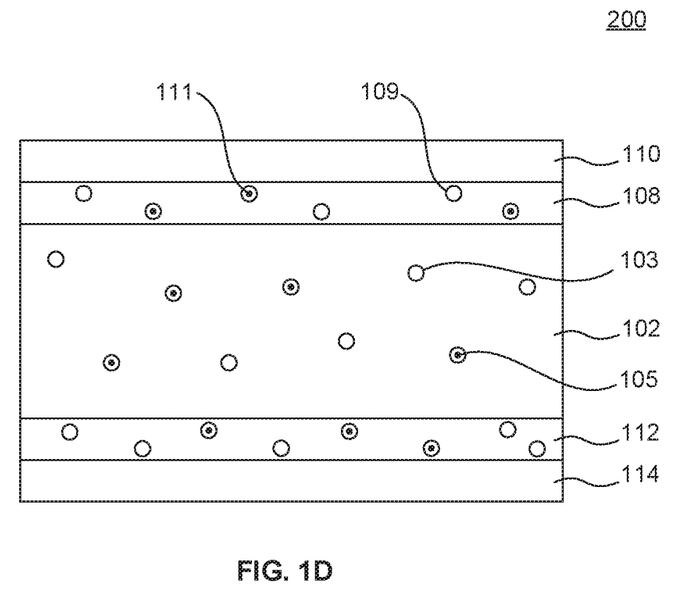
FIG. 1D illustrates a cross-section of a multi-layer film in accordance with an embodiment of the present disclosure.

FIG. 1D illustrates a multi-layer film 200 in accordance with an embodiment of the present disclosure. The multi-layer film 200 includes the core layer 102, intermediate layers 108, 112, and skin layers 110, 114 as arranged in the multi-layer film 100. In the multi-layer film 200, each of the core layer, intermediate layer 108, and intermediate layer 112 are cavitated. For example, if it was desired to have optical appearance on both sides of the film 200, both intermediate layers may be cavitated.

Figure 1E:
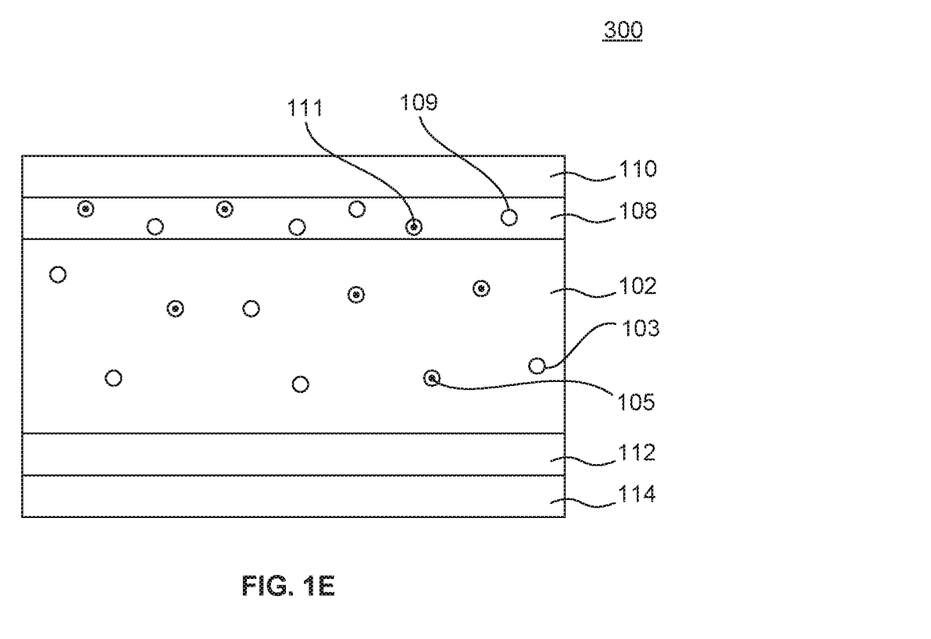
FIG. 1E illustrates a cross-section of a multi-layer film in accordance with an embodiment of the present disclosure.

FIG. 1E illustrates a multi-layer film 300 in accordance with an embodiment of the present disclosure. The multi-layer film 300 includes the core layer 102, intermediate layers 108, 112, and skin layers 110, 114 as arranged in the multi-layer film 100. In the multi-layer film 200, each of the core layer and the intermediate layer 108 are cavitated, but the intermediate layer 112 is not cavitated. For example, when the optical appearance on only one side is important it would not be necessary to cavitate intermediate layer 112.

Figure 1F:
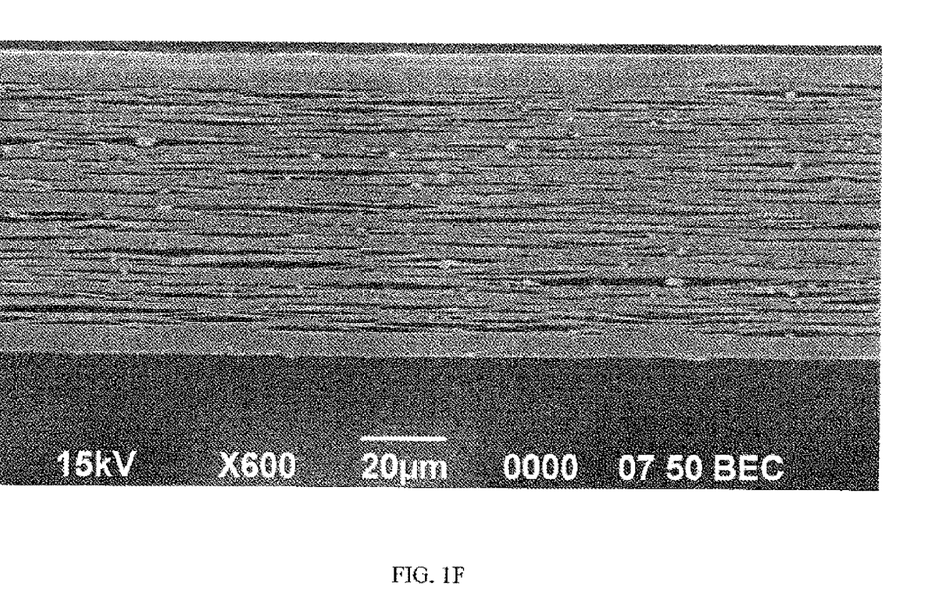
FIG. 1F illustrates a scanning electron microscopy (SEM) micrograph of a multi-layer film in accordance with an embodiment of the present disclosure.
Figure 1G:
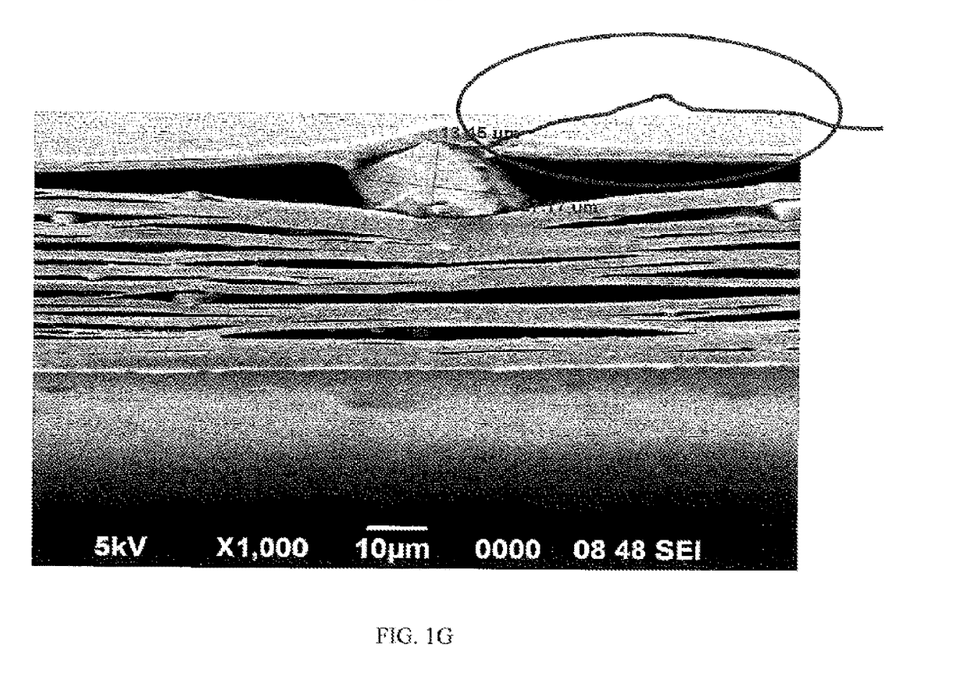
FIG. 1G illustrates an SEM micrograph of a surface of a multi-layer film when a cavitating agent having a large particle size is used.

FIG. 1G illustrates an SEM micrograph of an exemplary multi-layer film. As illustrated in FIG. 1G, selection of a low particle size cavitating agent can result in improved yield while also limiting and/or preventing effects on surface topology of the film. In contrast, FIG. 1F illustrates a multi-layer film where a large particle size cavitating agent can change the surface topology of the film.

The method of making a multi-layer film described herein is not limiting. One exemplary method of forming the multi-layer film is by coextruding the layers of the multi-layer film. Coextruding processes are well understood in the industry and the coextruded multi-layer film can be cooled on a drum whose surface temperature is controlled to, for example, between 20° C. and 60° C. to solidify the multi-layer film. The multi-layer film is stretched in the longitudinal direction at about 135° C. to 165° C. at a stretching ratio of, for example, about 4 to about 6 times the original length. The stretched multi-layer film is cooled to about 70° C. to 120° C. to obtain a uniaxially oriented multi-layer film.

The uniaxially oriented sheet is introduced into a tenter and heated to between 130° C. and 180° C. It is stretched in the transverse direction at a stretching ratio of, for example, about 7 to about 10 times the original length. The multi-layer film is then heat-set or annealed to reduce internal stresses, minimize shrinkage, and yield a thermally stable biaxially oriented multi-layer film.

A final step in the production of the BOPP film may be to pass the film through several rollers to ensure the film is wound flat without wrinkles. During the pass of the film through these rollers the surface energy of either one or both most exterior layers can be modified by surface treatment. This is achieved using different techniques known in art, which include one or several methods. Those methods include, but not limited to, corona discharge, flame treatment, polarized flame treatment, and/or atmospheric plasma treatment. Using these methods the surface energy is increased by creating polar groups that ensures that the films be receptive to coating, printing inks, adhesives, metal deposition or lamination to other films.

EXAMPLES

Example 1

A multi-layer BOPP film having, in order, a first skin layer, a first intermediate layer, a core layer, a second intermediate layer, and a second skin layer is co-extruded using an 8 meter wide cast film line. The overall thickness of the multi-layer BOPP film is about 58 µm, where the core layer is about 44 µm to about 54 µm, the first and second intermediate layers are about 3 µm to about 5 µm, and the first and second skin layers are about 1 µm to about 2 µm. The core layer was prepared by including about 10 wt % of calcium carbonate ($CaCO_3$) particles as a cavitating agent. The $CaCO_3$ particles were of a proprietary masterbatch having an average particle diameter of about 0.8 µm available from Inteplast Group Corporation. The core layer had about 10 wt % of the cavitating agent for a yield improvement in the BOPP film of about 7%. The gloss of the film in Example 1 was 61 as measured by ASTM D2457 at an angle of 45°. Opacity of the film was 91.87 as measured by Tappi T425.

Example 2

Example 2 was prepared and measured in the same manner as Example 1, except the multi-layer BOPP film is corona treated on the first and second skin layers. The gloss of the film in Example 2 was 67. The opacity of the film was 91.87.

Example 3

Example 3 was prepared and measured in the same manner as Example 1, except the core layer was prepared by including about 8 wt % of calcium carbonate ($CaCO_3$) particles as a cavitating agent. Further, the first intermediate layer was prepared by including about 8 wt % of $CaCO_3$ particles as a cavitating agent, where the $CaCO_3$ particles used in a masterbatch produced by A. Schulman Polybatch with an average particle diameter of about 2 to 4 µm with 11 µm as top cut The core layer and the first intermediate layer had about 8 wt % each of their respectively $CaCO_3$ particles. The overall yield improvement of the multi-layer film of Example 3 was about 7%. The gloss of the film in Example 3 was about 62, and the opacity was about 90.99.

Example 4

Example 4 was prepared and measured in the same manner as Example 4, except the multi-layer BOPP film is corona treated on the first and second skin layers. The gloss of the film in Example 4 was about 65. The opacity of the film was about 90.99.

Example 5

Example 5 was prepared and measured in the same manner as Example 1, except the core layer was prepared by including about 11 wt % of calcium carbonate ($CaCO_3$) particles as a cavitating agent. The core layer had about 11 wt % of the cavitating agent. The overall yield improvement of the multi-layer film of Example 5 was about 8%. The gloss of the film in Example 5 was about 65, and the opacity was about 91.92.

Example 6

Example 6 was prepared and measured in the same manner as Example 5, except the multi-layer BOPP film is corona treated on the first and second skin layers. The gloss of the film in Example 6 was about 78. The opacity of the film was about 91.92.

Example 7

Example 7 was prepared and measured in the same manner as Example 1, except the core layer was prepared by including about 17 wt % of calcium carbonate ($CaCO_3$) particles as a cavitating agent. The core layer had about 17 wt % of the cavitating agent. The overall yield improvement of the multi-layer film of Example 7 was about 14%. The gloss of the film in Example 7 was about 61, and the opacity was about 90.37.

Example 8

Example 8 was prepared and measured in the same manner as Example 7, except the multi-layer BOPP film is corona treated on the first and second skin layers. The gloss of the film in Example 8 was about 79. The opacity of the film was about 90.37.

Example 9

Example 9 was prepared and measured in the same manner as Example 1, except the core layer was prepared by including about 17 wt % of calcium carbonate ($CaCO_3$) particles as a cavitating agent. The core layer had about 17 wt % of the cavitating agent. The overall yield improvement of the multi-layer film of Example 9 was about 16%. The gloss of the film in Example 9 was about 61, and the opacity was about 91.29.

Example 10

Example 10 was prepared and measured in the same manner as Example 9, except the multi-layer BOPP film is corona treated on the first and second skin layers. The gloss of the film in Example 10 was about 76. The opacity of the film was about 91.29.

Comparative Example 1

Comparative Example 1 was a solid white BOPP film having an overall thickness of 58 μm. [Kelvin: please provide composition, manufacturer of this control film.] The film of Comparative Example 1 was measured in the same manner as Example 1, and had gloss of about 53, and the opacity was about 88.66.

Comparative Example 2

Comparative Example 2 was prepared and measured in the same manner as Comparative Example 1, except the solid white BOPP film is corona treated on the surfaces. The gloss of the film in Comparative Example 2 was about 55. The opacity of the film was about 88.66.

Comparative Example 3

Comparative Example 3 was prepared and measured in the same manner as Example 1, except the multi-layer film was scaled to an overall thickness of about 41 μm while maintaining the same relative thickness ratios between layers as in Example 1. Further, the core layer was prepared by including about 5 wt % of polybutylene terephthalate (PBT) particles as a cavitating agent, where the PBT particles were available from Tosaf, and having an average particle diameter of 2 μm and a distribution of. The core layer had about 5 wt % of the cavitating agent. The overall yield improvement of the multi-layer film of Comparative Example 3 was about 43%. The gloss of the film in Comparative Example 3 was about 60, and the opacity was about 75.

Comparative Example 4

Comparative Example 4 was prepared and measured in the same manner as Comparative Example 3, except the multi-layer BOPP film is corona treated on the first and second skin layers. The gloss of the film in Comparative Example 4 was about 60. The opacity of the film was about 75.

Comparative Example 5

Comparative Example 5 was prepared and measured in the same manner as Example 1, except the multi-layer film was scaled to an overall thickness of about 33 μm while maintaining the same relative thickness ratios between layers as in Example 1. Further, the core layer was prepared by including about 5 wt % of polybutylene terephthalate (PBT) produced by A. Schulman Polybatch and having an average particle size of 1 to 3 μm. The core layer had about 5 wt % of the cavitating agent. The overall yield improvement of the multi-layer film of Comparative Example 3 was about 43%. The gloss of the film in Comparative Example 5 was about 52, and the opacity was about 55.

Comparative Example 6

Comparative Example 6 was prepared and measured in the same manner as Comparative Example 3, except the multi-layer BOPP film is flame treated for proper adhesion of inks and/or adhesives. The gloss of the film in Comparative Example 6 was about 53. The opacity of the film was about 55.

TABLE 1

| | Thickness (μm) | Cavitating Agent (particle size, μm) | Cavitated Layer (% cavitating agent) | Gloss | Opacity |
|---|---|---|---|---|---|
| Ex 1 | 58 | $CaCO_3$ (0.8 μm) | Core (10%) | 61 | 91.87 |
| Ex 2 | 58 | $CaCO_3$ (0.8 μm) | Core (10%) | 67 | 91.87 |
| Ex 3 | 58 | $CaCO_3$ (0.8 μm); $CaCO_3$ (3 μm) | Core (8%); 1st intermediate layer (8%) | 62 | 90.99 |
| Ex 4 | 58 | $CaCO_3$ (0.8 μm); $CaCO_3$ (3 μm) | Core (8%); 1st intermediate layer (8%) | 65 | 90.99 |
| Ex 5 | 58 | $CaCO_3$ (0.8 μm) | Core (11%) | 65 | 91.12 |
| Ex 6 | 58 | $CaCO_3$ (0.8 μm) | Core (11%) | 78 | 91.12 |
| Ex 7 | 58 | $CaCO_3$ (0.8 μm) | Core (17%) | 61 | 90.37 |
| Ex 8 | 58 | $CaCO_3$ (0.8 μm) | Core (17%) | 79 | 90.37 |
| Ex 9 | 58 | $CaCO_3$ (0.8 μm) | Core (17%) | 61 | 91.29 |
| Ex 10 | 58 | $CaCO_3$ (0.8 μm) | Core (17%) | 76 | 91.29 |
| Comp Ex 1 | 58 | — | — | 53 | 88.66 |
| Comp Ex 2 | 58 | — | — | 55 | 88.66 |
| Comp Ex 3 | 41 | PBT (2 μm) | Core (5%) | 60 | 75 |
| Comp Ex 4 | 41 | PBT (2 μm) | Core (5%) | 60 | 75 |
| Comp Ex 5 | 33 | PBT (2 μm) | Core (5%) | 52 | 55 |
| Comp Ex 6 | 33 | PBT (2 μm) | Core (5%) | 53 | 55 |

Table 1 provides a summary of the gloss and opacity of the Examples and Comparative Examples provided herein. As discussed herein, it is desirable to have a BOPP film with high opacity and with gloss that is below a level where a pearlescent finish results. Typically, this level of gloss is about 60 to about 70. Below 60 is an insufficient level of gloss for label applications. In Examples 1 and 2, where the cavitation is at 8 to 10 wt % in the core layer, or the core and first intermediate layers, the opacity is high and gloss with and without corona treatment of the skin layers is below 70. Unexpectedly, in Examples 6, 8 and 10, where the cavitation is above 10 wt % in the core layer, the gloss with corona treatment of the skin layers is above 70. The opacity in Examples 6, 8, and 10 remains high. In the Comparative Examples 1 and 2, the behavior of the gloss without and with corona treatment is expectedly about the same. This behavior is also exhibited in Comparative Examples 3 and 4, and Comparative Examples 5 and 6, where the gloss is also about the same with and without corona treatment. However, Comparative Examples 3 to 6 have insufficient gloss, opacity, or both for label applications.

To summarize, the present disclosure describes, in some embodiments, a multi-layer film comprises a core layer having a first side and a second side opposite the first side, wherein the core layer comprises a polymer, a first intermediate layer disposed on the first side of the core layer, a second intermediate layer disposed on the second side of the core layer, a first skin layer disposed on the first intermediate layer and arranged such that the first intermediate layer is disposed between the core layer and the first skin layer, and a second skin layer disposed on the second intermediate layer and arranged such that the second intermediate layer is disposed between the core layer and the second skin layer, wherein the core layer has a thickness that is greater than thickness of the first or the second intermediate layers or the skin layer, wherein the core layer includes first particles disposed therein, wherein the amount of first particles ranges from about 8 to about 20 percent by weight (wt %), based on the total weight of the core layer, wherein the average particles size of the first particles ranges from about 0.8 μm to about 3.0 μm, wherein the opacity of the multi-layer film, measured by TAPPI T425, is about 90 or greater, and wherein the gloss of the multi-layer film, measured by ASTM D2457 at an angle of 45°, ranges from about 60 to less than about 80; and/or wherein the first or second intermediate layer further comprises second particles disposed therein, wherein the amount of second particles ranges from about 8 to about 10 percent by weight (wt %), based on the total weight of the first or second intermediate layer, wherein the average particles size of the second particles ranges from about 3.0 μm to about 3.5 μm; and/or wherein the first and second skin layers are corona treated, and wherein the gloss ranges from about 60 to about 70; and/or wherein the first or second intermediate layer further comprises a polymer matrix having voids disposed therein, and wherein at least some of the voids occupied by one or more of the second particles; and/or where the first and second skin layers are corona treated, and wherein the gloss ranges from about 60 to about 70; and/or wherein the core layer has a thickness ranging from about 54 μm to about 58 μm; and/or wherein the first and second intermediate layers have thicknesses ranging from about 1 μm to about 5 μm; and/or wherein the first and second skin layers have thicknesses ranging from about 1 μm to about 2 μm; and/or wherein the core layer comprises polypropylene; and/or wherein the intermediate layer comprises polypropylene; and/or wherein the skin layer comprises polypropylene; and/or wherein the core layer further comprises a polymer matrix having voids disposed therein, and wherein at least some of the voids occupied by one or more of the first particles; and/or wherein the first particles comprise calcium carbonate ($CaCO_3$); and/or where the opacity is about 90 to about 92.

In another aspect the present disclosure describes a label comprising a multi-layer film and an adhesive layer, wherein the multi-layer film comprises a core layer having a first side and a second side opposite the first side, wherein the core layer comprises a polymer, a first intermediate layer disposed on the first side of the core layer, a second intermediate layer disposed on the second side of the core layer, a first skin layer disposed on the first intermediate layer and arranged such that the first intermediate layer is disposed between the core layer and the first skin layer, and a second skin layer disposed on the second intermediate layer and arranged such that the second intermediate layer is disposed between the core layer and the second skin layer, wherein the core layer has a thickness that is greater than thickness of the first or the second intermediate layers or the skin layer, wherein the core layer includes first particles disposed therein, wherein the amount of first particles ranges from about 8 to about 20 percent by weight (wt %), based on the total weight of the core layer, wherein the average particles size of the first particles ranges from about 0.8 μm to about 3.0 μm, wherein the opacity of the multi-layer film, measured by TAPPI T425, is about 90 or greater, and wherein the gloss of the multi-layer film, measured by ASTM D2457 at an angle of 45°, ranges from about 60 to less than about 80; and/or wherein the first or second intermediate layer further comprises second particles disposed therein, wherein the amount of second particles ranges from about 8 to about 10 percent by weight (wt %), based on the total weight of the first or second intermediate layer, wherein the average particles size of the second particles ranges from about 3.0 μm to about 3.5 μm; and/or wherein the first and second skin layers are corona treated, and wherein the gloss ranges from about 60 to about 70; and/or wherein the core layer has a thickness ranging from about 54 μm to about 58 μm; and/or wherein the first and second intermediate layers have thicknesses ranging from about 1 μm to about 5 μm; and/or wherein the first and second skin layers have thicknesses ranging from about 1 μm to about 2 μm; and/or where the opacity is about 90 to about 92.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. A multi-layer film, comprising:
a core layer having a first side and a second side opposite the first side, wherein the core layer comprises a polymer;
a first intermediate layer disposed on the first side of the core layer;
a second intermediate layer disposed on the second side of the core layer;
a first skin layer disposed on the first intermediate layer and arranged such that the first intermediate layer is disposed between the core layer and the first skin layer; and
a second skin layer disposed on the second intermediate layer and arranged such that the second intermediate layer is disposed between the core layer and the second skin layer,
wherein the core layer has a thickness that is greater than thickness of the first or the second intermediate layers or the first or the second skin layers,
wherein the core layer includes first particles disposed therein,
wherein the amount of first particles ranges from about 8 to about 20 percent by weight (wt %), based on the total weight of the core layer,
wherein the average particles size of the first particles ranges from about 0.8 μm to about 3.0 μm,
wherein the multi-layer film is a biaxially oriented film, wherein the multi-layer film has been stretched in a longitudinal direction to about 4 to about 6 times an original length, and has been stretched in a transverse direction to about 7 to about 10 times an original length,
wherein the opacity of the multi-layer film, measured by TAPPI T425, is about 90 or greater, and
wherein the gloss of the multi-layer film, measured by ASTM D2457 at an angle of 45°, ranges from about 60 to less than about 80.

2. The multi-layer film of claim 1, wherein the first or second intermediate layer further comprises:
second particles disposed therein,
wherein the amount of second particles ranges from about 8 to about 10 percent by weight (wt %), based on the total weight of the first or second intermediate layer,
wherein the average particles size of the second particles ranges from about 3.0 μm to about 3.5 μm.

3. The multi-layer film of claim 2, where the first and second skin layers are corona treated, and wherein the gloss ranges from about 60 to about 70.

4. The multi-layer film of claim 2, wherein the first or second intermediate layer further comprises:
a polymer matrix having voids disposed therein, and
wherein at least some of the voids occupied by one or more of the second particles.

5. The multi-layer film of claim 1, where the first and second skin layers are corona treated, and wherein the gloss ranges from about 60 to about 70.

6. The multi-layer film of claim 1, wherein the core layer has a thickness ranging from about 54 μm to about 58 μm.

7. The multi-layer film of claim 1, wherein the first and second intermediate layers have thicknesses ranging from about 1 μm to about 5 μm.

8. The multi-layer film of claim 1, wherein the first and second skin layers have thicknesses ranging from about 1 μm to about 2 μm.

9. The multi-layer film of claim 1, wherein the core layer, the intermediate layer, and the skin layer comprise polypropylene.

10. The multi-layer film of claim 1, wherein the core layer further comprises:
a polymer matrix having voids disposed therein, and
wherein at least some of the voids occupied by one or more of the first particles.

11. The multi-layer film of claim 1, wherein the first particles comprise calcium carbonate ($CaCO_3$).

12. The multi-layer film of claim 1, where the opacity is about 90 to about 92.

13. A label, comprising:
the multi-layer film of claim 1; and
an adhesive layer.

14. The label of claim 13, wherein, in the multi-layer film, the first or second intermediate layer further comprises:
second particles disposed therein,
wherein the amount of second particles ranges from about 8 to about 10 percent by weight (wt %), based on the total weight of the first or second intermediate layer,
wherein the average particles size of the second particles ranges from about 3.0 μm to about 3.5 μm.

15. The label of claim 14, where the first and second skin layers are corona treated, and wherein the gloss ranges from about 60 to about 70.

16. The label of claim 13, wherein, in the multi-layer film, the first and second skin layers are corona treated, and wherein the gloss ranges from about 60 to about 70.

17. The label of claim 13, wherein the core layer has a thickness ranging from about 54 µm to about 58 µm.

18. The label of claim 13, wherein the first and second intermediate layers have thicknesses ranging from about 1 µm to about 5 µm.

19. The label of claim 13, wherein the first and second skin layers have thicknesses ranging from about 1 µm to about 2 µm.

20. The label of claim 13, where the opacity is about 90 to about 92.

* * * * *